United States Patent
Koch

(10) Patent No.: US 7,412,040 B2
(45) Date of Patent: Aug. 12, 2008

(54) SYSTEMS AND METHODS FOR PROVIDING REAL-TIME CONVERSATION USING DISPARATE COMMUNICATION DEVICES

(75) Inventor: Robert A. Koch, Norcross, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 0 days.

(21) Appl. No.: 11/369,435

(22) Filed: Mar. 7, 2006

(65) Prior Publication Data
US 2006/0146994 A1 Jul. 6, 2006

Related U.S. Application Data

(63) Continuation of application No. 10/184,789, filed on Jun. 28, 2002, now Pat. No. 7,065,185.

(51) Int. Cl.
*H04M 11/00* (2006.01)
(52) U.S. Cl. .................................. 379/88.14; 379/93.15
(58) Field of Classification Search ............. 379/88.13, 379/88.14, 88.16, 93.15, 201.01, 52, 88.22, 379/93.01, 88.17, 93.32
See application file for complete search history.

(56) References Cited

U.S. PATENT DOCUMENTS

| | | | | |
|---|---|---|---|---|
| 6,430,604 B1 * | 8/2002 | Ogle et al. | .................. | 709/207 |
| 6,697,474 B1 * | 2/2004 | Hanson et al. | ......... | 379/201.01 |
| 6,816,578 B1 * | 11/2004 | Kredo et al. | ............. | 379/88.17 |
| 6,941,345 B1 * | 9/2005 | Kapil et al. | .................. | 709/206 |
| 2002/0130904 A1 * | 9/2002 | Becker et al. | ............... | 345/753 |

\* cited by examiner

*Primary Examiner*—Olisa Anwah
(74) *Attorney, Agent, or Firm*—Withers & Keys, LLC

(57) ABSTRACT

Systems and methods for providing real-time conversation among a plurality of disparate communication devices include receiving a first communication from a first communication device operating in a first communication mode, translating the first communication into a second communication that is suitable for processing by a second communication device operating in a second communication mode, wherein the second communication mode is different from the first communication mode, and providing the second communication to the second communication device.

17 Claims, 7 Drawing Sheets

400

| ID | Destination Address | Device Type |
|---|---|---|
| 404a<br>Jim at home | 406a<br>111-211-1212 | 408a<br>Audio |
| 404b<br>Jim at work | 406b<br>111-311-1313 | 408b<br>Audio |
| 404c<br>Jim's PC Phone | 406c<br>111-411-1414 | 408c<br>Audio |
| 404d<br>Jim's Text Pager | 406d<br>Jim@pc.com | 408d<br>Data |

FIG. 4

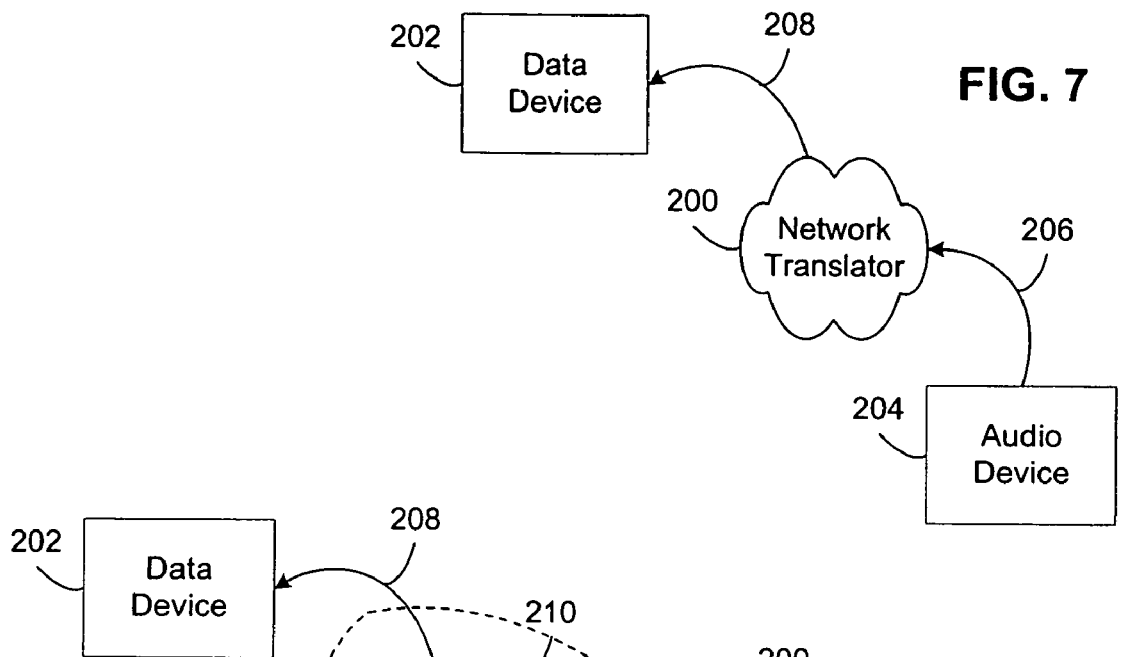
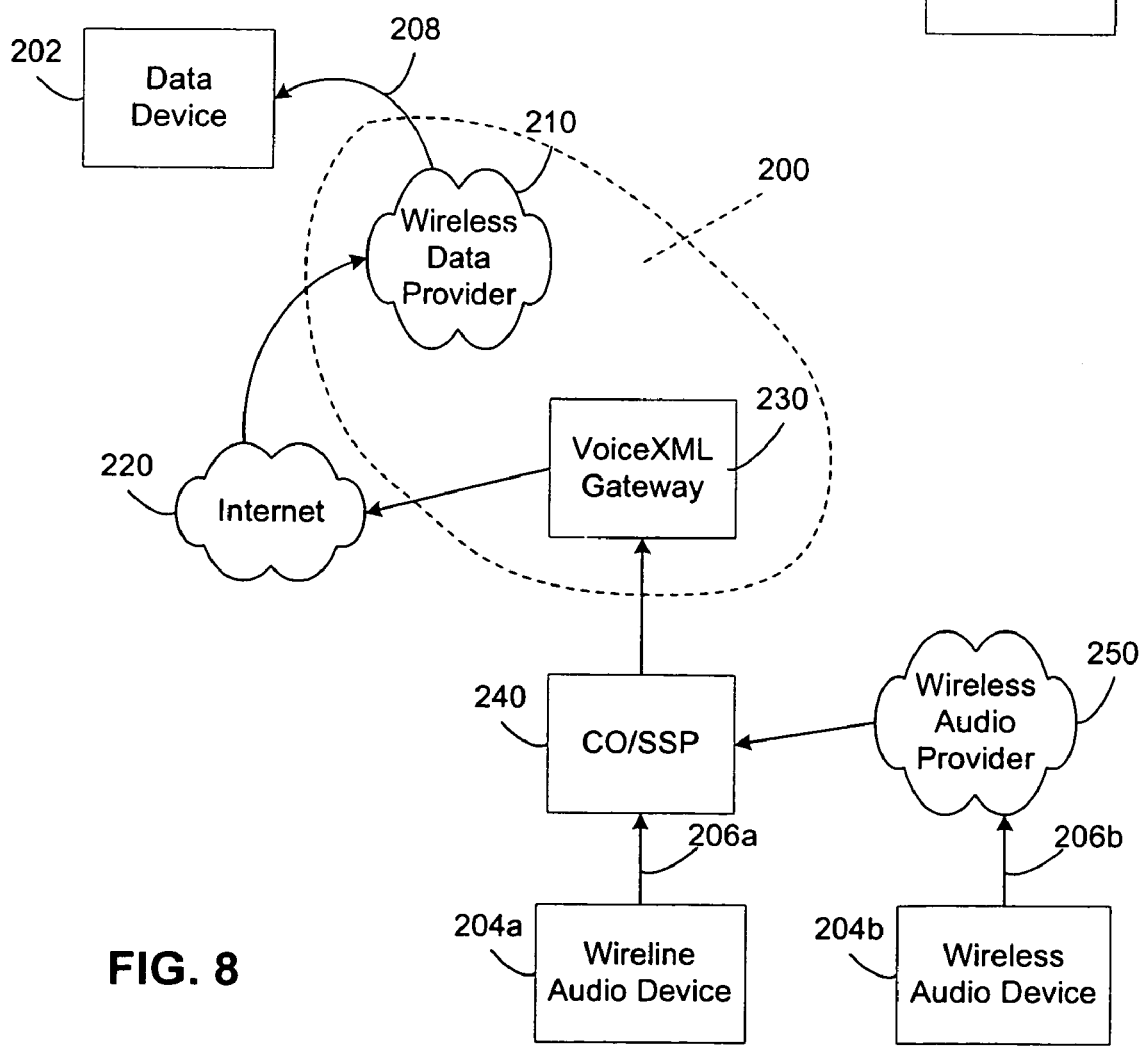

US 7,412,040 B2

SYSTEMS AND METHODS FOR PROVIDING REAL-TIME CONVERSATION USING DISPARATE COMMUNICATION DEVICES

RELATED APPLICATIONS

The present application is a continuation of U.S. application Ser. No. 10/184,789 filed on Jun. 28, 2002 now U.S. Pat. No. 7,065,185, and entitled Systems and Methods for Providing Real-Time Conversation Using Disparate Communications Devices.

FIELD OF THE INVENTION

This invention relates to the field of communication systems. More particularly, the invention relates to systems and methods for providing real-time conversation among a plurality of disparate communication devices.

BACKGROUND OF THE INVENTION

Frequently, occasions arise where two or more parties wish to communicate with each other in real-time but are unable to do so because the parties do not have access to a common communication medium. For example, one party might have access to only a voice medium (e.g., a telephone) while the other party has access to only a data medium (e.g., a personal digital assistant). Similarly, a first party might be using an instant messaging service (i.e., data), while a second party is using a wireless phone (i.e., voice).

Other occasions arise where one or more of the parties is in a situation that is not conducive to common media conversation. For example, one party might be using a telephone, but the other is in a meeting and cannot receive audio or respond with audio. In such a circumstance, the second party might prefer to use a text (i.e., data) based communication device, such as an alpha pager, a text phone, or a PDA, for example.

Sometimes, the parties simply prefer to use different communication media for whatever reasons.

In such situations, the parties are typically unable to communicate with one another in real-time because a communication device operating in a data mode (i.e., in a mode that enables the device to send and receive data, such as text, for example) is unable to communicate with a communication device operating in an audio mode (i.e., in a mode that enables the device to send and receive audio, such as speech, for example). It would be advantageous, therefore, if systems and methods were available that enabled parties using disparate communications devices to conduct a real-time conversation.

BRIEF SUMMARY OF THE INVENTION

The invention provides systems and methods for providing real-time conversion between disparate communications media. A method according to the invention can include receiving a first communication from a first (originating) communication device operating in a first communication mode. The first communication mode can be a data mode or an audio mode. A determination can be made as to whether a second (destination) communication device is operating in a second communications mode that is different from the first communications mode. The first communication can be translated into a second communication that is suitable for processing by the second communication device, and provided to the second communication device.

Where the first communication includes an audio message, translating the first communication into the second communication can include extracting the audio message from the first communication and performing an audio-to-data conversion of the audio message to form a data message. The audio-to-data conversion can include a speech-to-text conversion, for example, or recording the audio message as a recorded audio data file.

Where the first communication includes a data message, translating the first communication into the second communication can include extracting the data message from the first communication and performing a data-to-audio conversion of the data message to form an audio message. The data-to-audio conversion can include a text-to-speech conversion, for example.

To assist in initiating the conversation, the first communication device can be provided with a destination list that includes one or more destinations. Thus, the user of the first communication device can be enabled to select a destination associated with the second communication device from the destination list. The user of the first communication device can also be enabled to provide and modify the destination list. For this purpose, a user interface can be provided via which the user of the first communication device can provide and modify the destination list.

BRIEF DESCRIPTION OF THE SEVERAL VIEWS OF THE DRAWING

Other features of the invention are further apparent from the following detailed description of the embodiments of the present invention taken in conjunction with the accompanying drawing, of which:

FIG. 4 depicts a preferred embodiment of a contacts list;

FIGS. 7 and 8 are functional block diagrams of an embodiment of a system according to the invention in which a conversation between disparate communication devices is initiated via a communication device operating in audio mode;

DETAILED DESCRIPTION OF THE INVENTION

Figure 1:
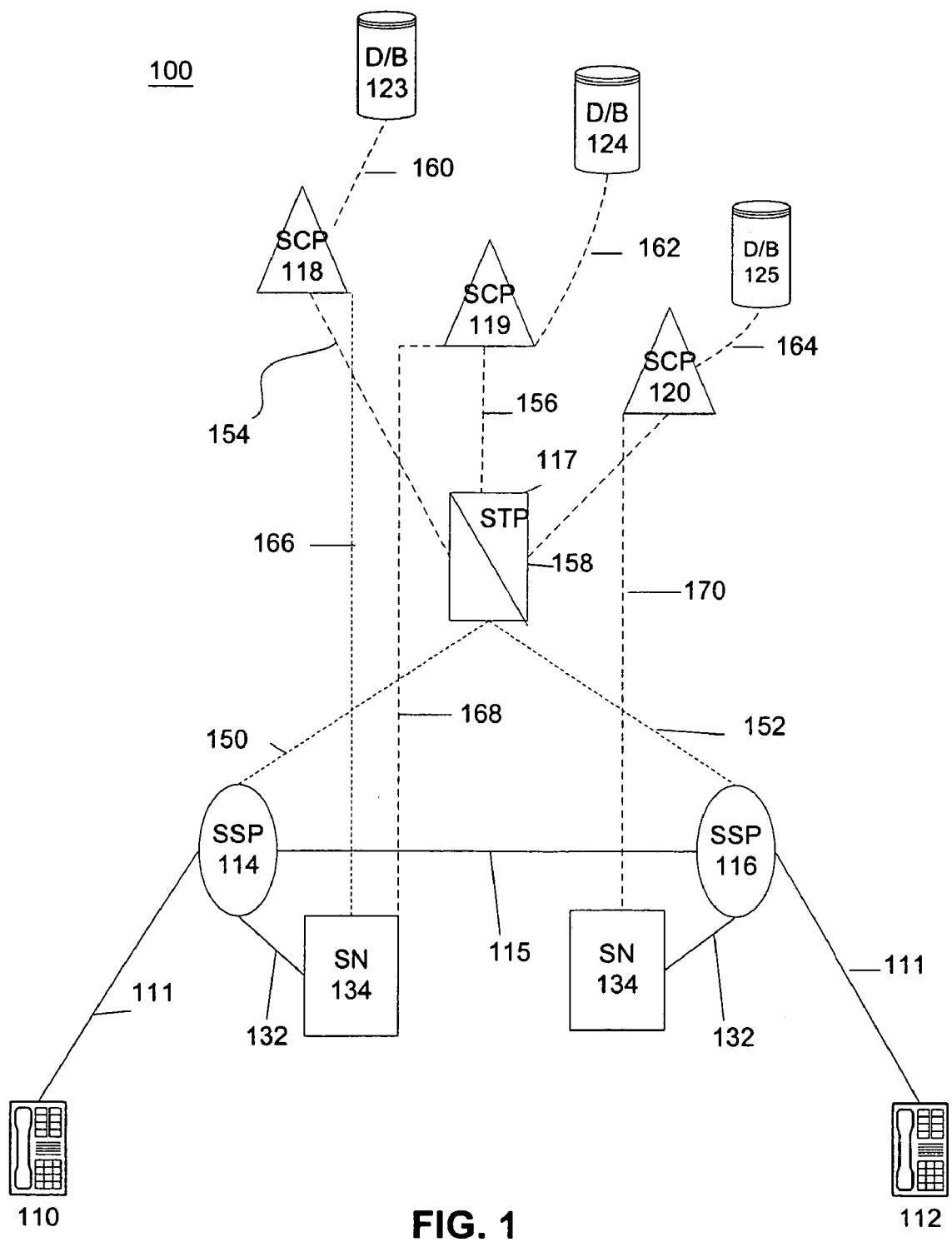
FIG. 1 is a block diagram of an exemplary telecommunication network in which the principles of the invention can be employed.

FIG. 1 is a block diagram of an exemplary telecommunication network 100, such as a public switched telecommunications network (PSTN), in which the principles of the invention can be employed. More particularly, FIG. 1 illustrates a simplified advanced intelligent network (AIN). AIN systems are described in U.S. Pat. No. 5,701,301, the disclosure of which is hereby incorporated herein by reference. Though the various features and aspects of the invention can be utilized in conjunction with an AIN, it should be understood that the invention is not limited to AIN-based systems, and that other networks and system arrangements can be used in accordance with the invention.

As shown, the AIN 100 can include a plurality of service switching points (SSPs) 114, 116. SSPs 114, 116 are capable of generating AIN queries. An SSP, which is also known as a "central office," is basically a switch and the terms are used interchangeably herein. SSPs 114 and 116 can comprise, for example, DMS100 or 5ESS switches. These switches can be manufactured by, for example, Lucent Technologies, Inc. or Nortel Networks.

Each of the SSPs 114, 116 can have one or more subscriber lines 111 connected thereto. Subscriber lines 111 may also be referred to as calling lines. Each SSP 114, 116 serves a designated group of calling lines 111, and thus, the SSP that serves a particular calling line may be referred to as its serving switch. Typically, each calling line 111 is connected to one or more pieces of terminating equipment 110, 112, such as a telephones, facsimile machines, computers, modems, or other such telecommunication devices.

SSPs 114, 116 are interconnected by one or more trunk circuits 115. Trunks 115 are basically the voice paths via which communications are connected between SSPs. The term "communication" or "call" is used herein to include all messages that may be exchanged between the calling party and the called party in a telecommunication network, such as illustrated in FIG. 1. Trunk 115 can be either a Signaling System 7 (SS7) controlled multi-frequency (MF) trunk, or primary rate interface (PRI) trunk or the like. The type of trunk will be in accordance with both the sending and receiving SSP to which it is connected.

Each SSP 114, 116 can include different types of facilities and/or triggers. SSPs 114 and 116 are programmable switches that can perform some or all of the following functions: recognize AIN-type calls, launch queries, and receive commands and data to further process and route AIN-type calls. When one of SSPs 114 or 116 is triggered by an AIN-type call, the triggered SSP 114 or 116 formulates and sends an AIN query. Based on the reply from the AIN network, SSP 114 or 116 responds to call processing instructions received.

Each of SSPs 114 and 116 is connected to a signal transfer point (STP) 117 via respective data links 150, 152. Data links 150, 152 can employ SS7, for example, though it should be understood that any suitable signaling protocol could be employed. To facilitate signaling and data messaging, each SSP 114 and 116 can be equipped with Common Channel Signaling (CCS) capabilities, e.g., SS7, which provides two-way communications of data messages over CCS links 150 and 152 between components of the AIN network. The data messages can be formatted in accordance with the Transaction Capabilities Applications Part (TCAP). Alternatively, Integrated Service Digital Network (ISDN) Users Part (ISUP) can be used for signaling purposes between, for example, SSPs 114 and 116. In such a case, SSPs 114 and 116 can be equipped with the capability to map appropriate data between TCAP and ISUP protocols, and vice versa. The telephone network basically employs an upper-level software controlled network through the STPs and the SCP.

SSPs 114 and 116 may allow normal switch processing to be suspended at specific points in a call so that the switch can send an AIN message query via signaling transfer point (STP) 117 to SCP 118, 119 or 120. SCP 118, 119 or 120 may execute software based service logic and return call-processing instructions to the triggering AIN SSP. New services may be provisioned by assigning AIN SSP triggers to customer lines, trunks, and/or NANP (North American Numbering Plan) telephone numbers.

Much of the intelligence of the AIN resides in a type of AIN element referred to as a service control point (SCP) 118, 119, 120 that is connected to STP 117 over an SS7 data link, or the like, 154, 156 or 158. Accordingly, the connections by links 150, 152, 154, 156, and 158 are for signaling purposes and allow SSPs 114 and 116 to send messages to, and receive messages from, SCP 118, 119 and 120.

Among the functions performed by SCP 118, 119, 120 is the hosting of network databases and subscriber databases, which may be stored in respective data storage objects 123, 124, 125. For example, data storage object 123 is shown as a database communicatively coupled via respective communication paths 160, 162, 164 to SCP 118, although data storage object 123 can be embodied as a component within SCP 118, such as an internally-mounted hard disk device. The databases stored in data storage object 123 may be used in providing telecommunications services to a customer. Typically, SCP 118, 119, 120 is also the repository of service package applications (SPAs) that are used in the application of telecommunication services, enhanced features, or subscriber services to calling lines. Additionally, SPAs may use databases for providing telecommunication services.

A set of triggers can be defined at the SSPs 114, 116. A trigger in the AIN is an event associated with a particular call that initiates a query to be sent to SCP 118, 119, or 120. The trigger causes selected SCP 118, 119, or 120 to access, if necessary, its respective database 123, 124, or 125 for processing instructions with respect to the particular call. The results of the SCP processing and/or database inquiry is/are sent back to selected SSP 114 or 116 in a response through STP 117. The return packet includes instructions to SSP 114, 116 as to how to process the call. The instructions may be to take some special action as a result of a customized calling service, enhanced feature, or subscriber service. In response, switch 114, 116 moves through its call states, collects the called digits, and generates further packets that are used to set up and route calls. Similar devices for routing calls among various local exchange carriers are provided by regional STP and regional SCP.

An example of such a trigger is a termination attempt trigger (TAT), which causes a query to be sent to SCP 118, 119, or 120 whenever an attempt is made to terminate a call on the line of subscriber 110 or 112. Another type of trigger that may be used is a Public Office Dialing Plan (PODP) trigger, though it should be understood that the principles of the invention include the use of other triggers.

The AIN can also include a services circuit node 134 (SCN), which may also be referred to herein as a services node (SN). SN 134 is an interactive data system that acts as a switch to transfer calls. SN 134 may provide interactive help, collect voice information from participants in a call, and/or provide notification functions. SN 134 can be a Lucent Technologies Star Server FT Model 3200 or Model 3300 although other such devices can be employed. SN 134 can include voice and dual tone multi-frequency (DTMF) signal recognition devices and/or voice synthesis devices. In addition, SN 134 can include a data assembly interface. SN 134 can be connected to local SCP 118, 119, 120 via respective data links 166, 168, 170 using an X.25, SS7 or TCP/IP protocol or any other suitable protocol. In addition, SN 134 typically may be connected to one or more (but usually only a few) SSPs via Integrated Service Digital Network (ISDN) lines or any other kind of suitable telephone lines 132.

One skilled in the art will further recognize that the above-described network is a simplified network meant for explanatory purposes. It is likely that a telephone network might include numerous user stations, SSPs, STPs, SCPs, and SNs along with other telephone network elements, and can employ other types of triggers without departing from the spirit and scope of the invention.

Figure 2:
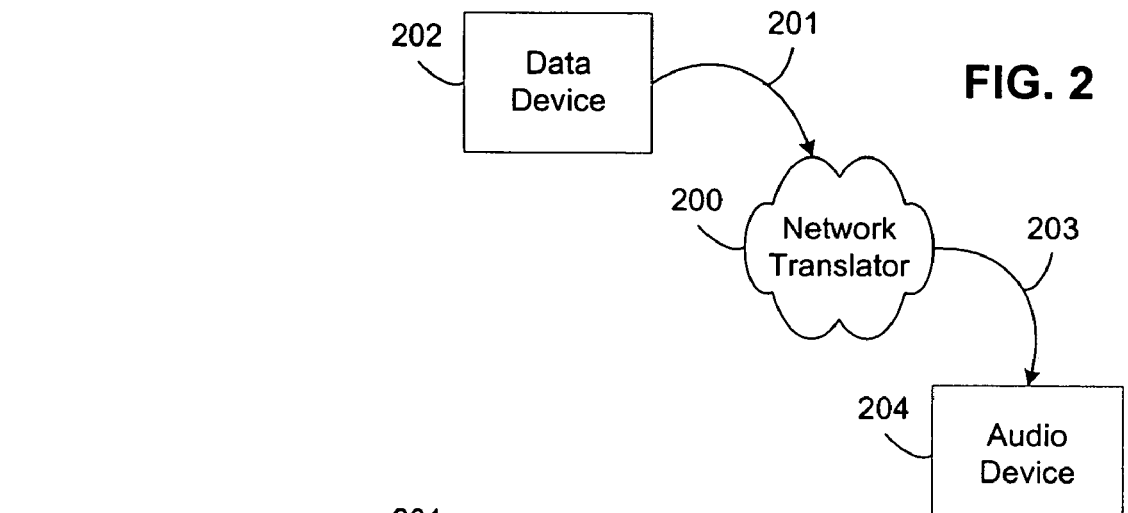
FIGS. 2 and 3 are functional block diagrams of an embodiment of a system according to the invention in which a conversation between disparate communication devices is initiated via a communication device operating in a data mode.
Figure 3:
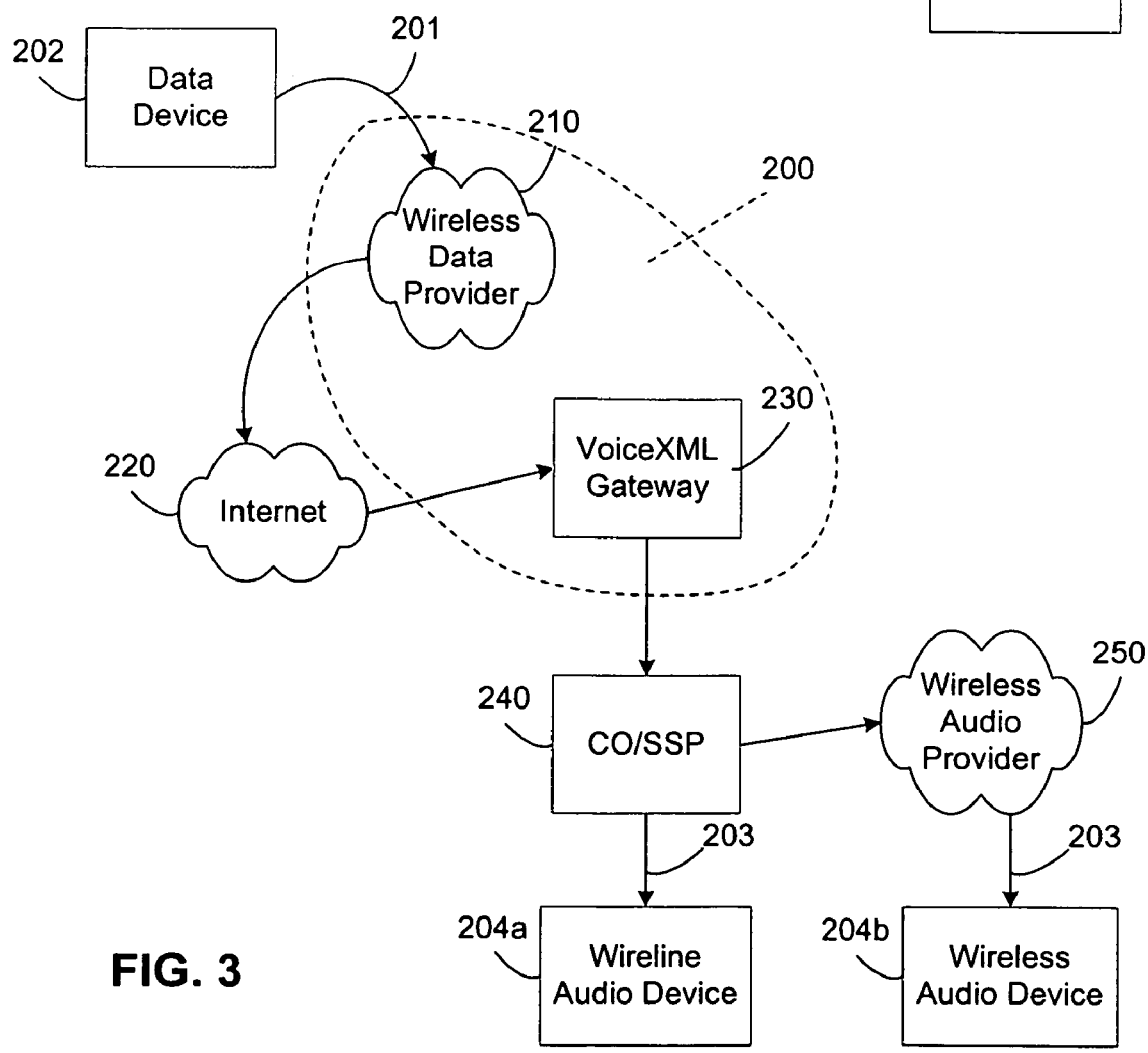

FIGS. 2 and 3 are functional block diagrams of an embodiment of a system according to the invention in which a conversation between disparate communication devices is initiated via a communication device operating in a data mode. As shown, a data device 202, which can be any wireless or wireline communication device that operates in a data mode, provides a data communication 201 to a network translator 200. Examples of such a data device 202 include personal digital assistants (PDAs), text phones, alpha pagers, internet appliances that provide electronic mail or instant messaging services, etc. The data communication 201 can be, for example, a text message that a user of the data device 202 has typed into, spoken into, or otherwise provided to, the data device 202. The audio device 204 can be any wireline communication device 204a or wireless communication device 204b that operates in an audio mode. The audio device 204 can be, for example, a telephone, mobile phone, personal computer (PC), or Internet appliance that provides audio input and output, etc.

Consider an exemplary scenario where a working mother, Susan, is planning to pick up her son, Billy, from school on her way home from work. Susan is stuck in a meeting, however, and needs to communicate this to her husband, Jim, who is at home. Because she is in a meeting, Susan wishes to use her wireless PDA (a data device) to initiate the conversation. To be sure that Jim gets the message in a timely fashion, however, Susan wishes to send the message to Jim via their home telephone (an audio device).

Preferably, Susan is able to select a destination from among a list that includes a plurality of destination options that are made available to her via her PDA. Such a list of destination options can be provided by the user via a Web or telephone based interface, as described in detail below. An exemplary destination list 400 from which the user of the data device 202 can select a destination is depicted in FIG. 4. As shown, the destination list 400 can include a plurality of destination options 402a-d. Each such destination option 402a-d can include, for example, a respective identifier 404a-d and destination address 406a-d. The identifier 406a-d can be a phone number or network address, for example, via which the associated destination 402a-d can be reached. Each such destination option 402a-d can also include a device type 408a-d that corresponds to the type of device (e.g., data or audio) that corresponds to the destination address 406a-d.

Preferably, the network translator service 200 stores and maintains a respective destination list associated with each user of the service. For this purpose, the network translator service 200 can include a data store (not shown) that contains the list of destinations. For example, the wireless data provider 210 can include one or more data stores and one or more applications programs for maintaining the destination lists. When the user accesses the wireless data provider 210 (e.g., by turning on her PDA for example), the list of destinations is made available to the user's data device 202. The list can be downloaded to the data device 202 each time the user accesses the service, or whenever the user requests them. The entire list can be downloaded, or only any changes that might exist can be downloaded. The list can then be stored in a local memory on the data device 202. Alternatively, the destination list can be stored locally to the data device 202. For example, the list can be integrated with an address book application provided on the device itself.

The network translator 200 can also provide a user interface via which a user of the service can provide or modify the destinations in his or her list. For example, when the user initially signs up for the service (which may or may not be offered as a subscription service), the network translator can provide a user interface, which can be telephone or web based, via which the user can input the respective identifiers and communication pathways that define each destination. The user can also access the network translator service to modify the list of destinations by adding, changing, or deleting one or more destinations.

The user can generate the data message by typing a text message such as "Jim, I'm stuck in a meeting. Can you pick up Billy at school?" She then sends the communication to the selected destination by selecting a "send" option, for example, as is ordinarily provided by a data messaging client on such a data device 202.

The network translator 200 receives the data communication 201 from the data device 202. Where the data device is a wireless device, the wireless data provider 210 receives the data communication 201. Preferably, the data communication 201 includes an origination address that corresponds to the device that originated the message (e.g., an address that corresponds to Susan's PDA), a destination address that corresponds to the device to which the message is directed (e.g., Jim's home phone number), a device type that identifies the device type of the destination device (e.g., data or audio), and the data message (e.g., the text message Susan provided).

The network translator 200 can attempt to establish an audio connection with the destination before translating the communication. To establish such a connection, a call request can be initiated via a gateway 230, which can be a VoiceXML gateway, for example. The gateway can determine from the origination address whether the originating device is a data device or an audio device. Similarly, the gateway can determine from the destination address whether the destination device is an audio device or a data device. Thus, the gateway can determine whether a translation is necessary.

Preferably, the network translator stores the destination and origination addresses of the devices for the duration of the conversation. The call request is passed to an element of the PSTN, such as a CO/SSP 240 to establish the call connection to the audio device 204. If the audio device 204 is a wireless audio device 204b, then the call request is passed through a wireless audio provider 250 to establish the wireless path.

If a connection cannot be established (e.g., Jim does not answer the phone), the network translator service 200 so notifies the user of the data device by a return text message such as "Jim is not available. Please try again later." If a connection is established (e.g., Jim answers the phone), then a data-to-audio converter extracts the data message from the data communication, and translates the data message into an audio message. The data-to-audio converter can be included as part of the VoiceXML gateway, which uses known text-to-speech (TTS) techniques to translate text data into audio. Thus, the network translator can translate a data communication received from a communication device operating in a data mode, into an audio communication that is suitable for reception by a communication device operating in an audio mode.

The network translator then provides the audio communication to the audio device. For example, when Jim answers up the phone, the translator service can provide an audio message such as "You have a call from Susan. Message: I'm stuck in a meeting. Can you pick up Billy at school? Please speak your reply, and then press the pound key."

The user of the receiving audio device can then provide an audio reply that the network translator translates into a data communication, and provides to the data device. For example, Jim can speak into his home phone any message that he wishes to send to Susan in reply to her request. For example, Jim can say something like "OK, I'll pick him up.

See you at home tonight." After completing his message, Jim presses the # key to initiate delivery of the reply communication to Susan's data device.

Figure 5:
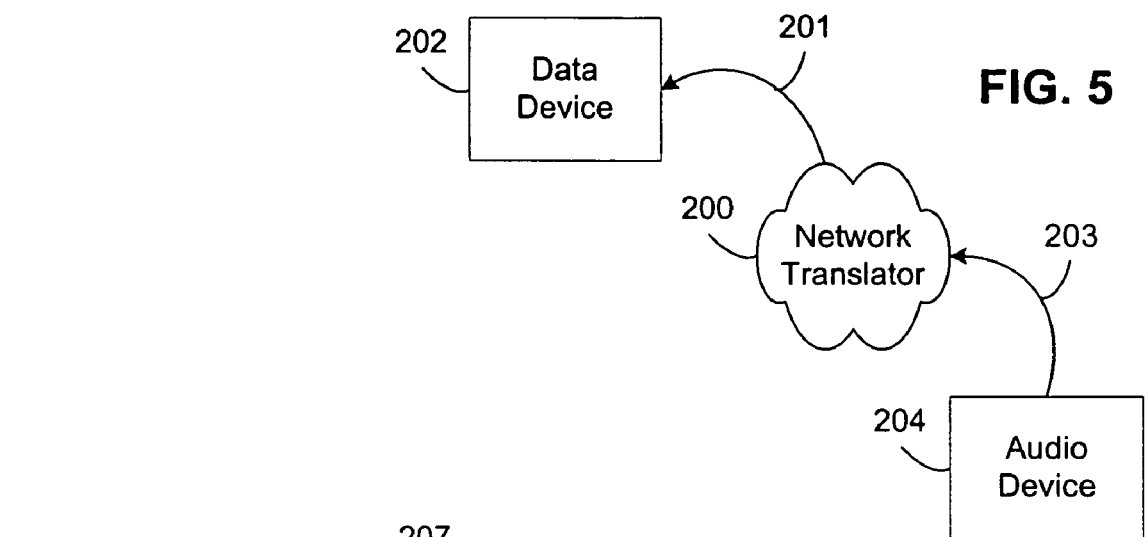
FIGS. 5 and 6 are functional block diagrams that depict an audio-to-data reply to a conversation between disparate communication devices initiated via a data device.
Figure 6:
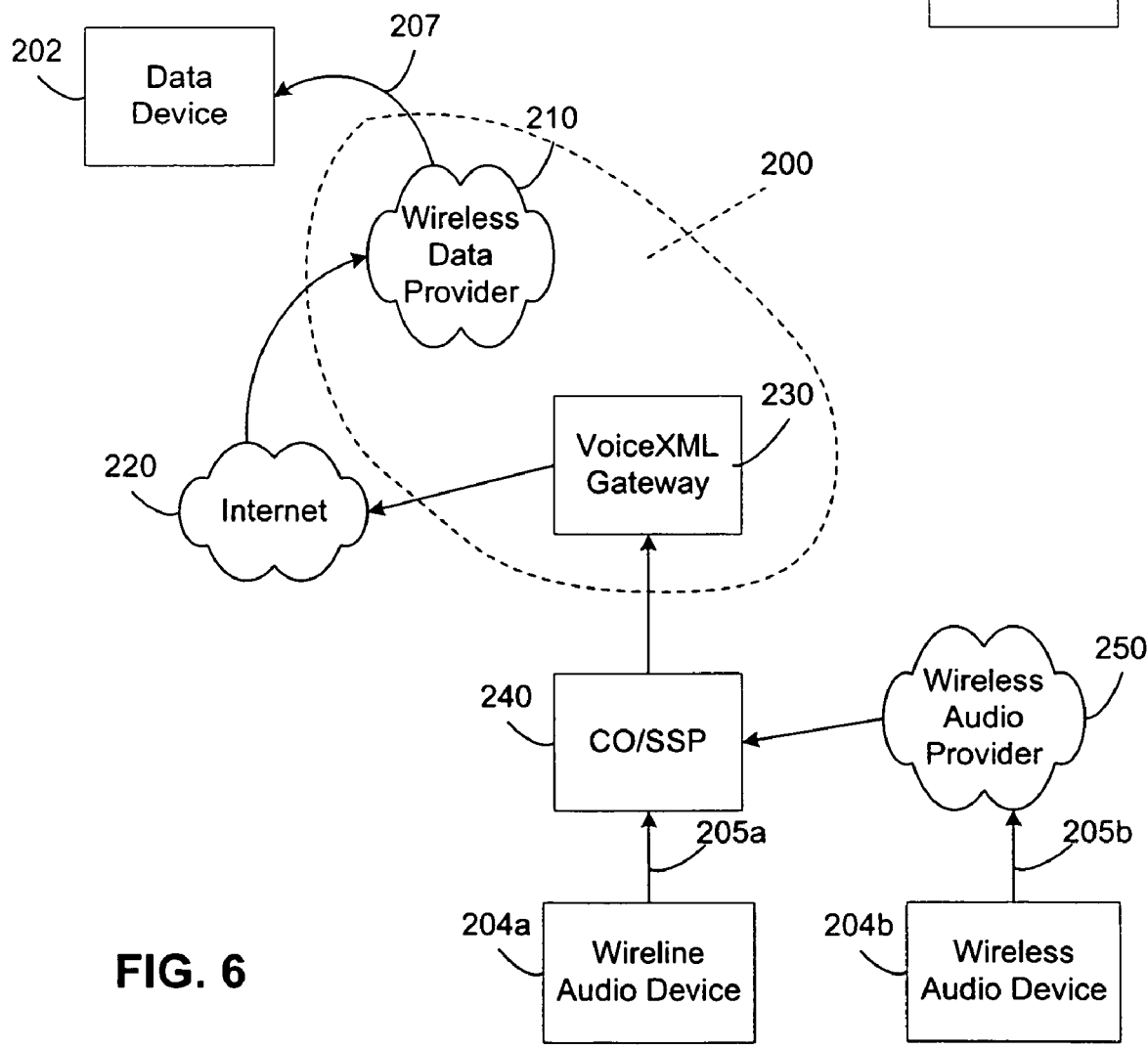

FIGS. 5 and 6 are functional block diagrams that depict an audio-to-data reply to a conversation between disparate communication devices initiated via a data device. After the party using the audio device initiates delivery of the reply, the audio device provides an audio communication to the network translator 200. As shown, the audio reply can be provided to the CO/SSP, via the wireless audio provider, where necessary. The CO/SSP delivers the audio reply message to the converter VoiceXML gateway.

The VoiceXML gateway can include an applications program that performs any of a number of well-known speech-to-text algorithms. For example, simple speech-to-text conversion can be performed, or the application could perform speech recognition against a pre-defined vocabulary. It should be understood, however, that any audio-to-data conversion algorithm could be used. For example, allowable replies might be limited to a predefined set of utterances, such as "yes," "no," numbers, and the like.

Alternatively, the VoiceXML gateway may include recording means for recording the audio message as a recorded audio data file, such as a .wav file, for example. Such a recorded audio data file is a data file that includes the audio message (e.g., speech) and can be delivered to the destination data device. Such an approach is desirable where the destination data device is capable of playing such an audio data file. Thus, the user of the data device can hear the recorded audio via the data device.

The VoiceXML gateway provides the data reply to the data device. The data reply includes the data message corresponding to the audio reply message, as well as the address of the data device to which the data message is to be delivered. As shown, the VoiceXML gateway could provide the data reply to the data device via the Internet (and the wireless data provider, if the data device is wireless).

When the data device receives the data message, the text message is displayed to user of data device. For example, in the exemplary scenario, the text message "OK, I'll pick him up. See you at home tonight" would be displayed on Susan's PDA.

The user of the data device can continue the conversation by typing another text message such as "Thank you. Will you make dinner, too?" or simply end the conversation. Thus, a real-time conversation between two parties using disparate communication devices can be established and maintained.

FIGS. 7 and 8 are functional block diagrams of an embodiment of a system according to the invention in which a conversation between disparate communication devices is initiated via a communication device operating in an audio mode. To initiate a conversation from an audio device 204, the user of the audio device 204 preferably dials an access number, which terminates on the VoiceXML gateway 330. Preferably, as described in detail above, the network translator service 200 stores and maintains a list of destinations associated with each user of the service. Preferably, the lists are stored and maintained in a contacts directory for each user. When the user of the audio device 204 accesses the service, the network translator 200 accesses the destination list associated with the audio device (e.g., the calling line number).

The user of the audio device 204 can select a destination from among a plurality of destination options that are made available to him by providing an identifier that is associated with the destination to which the user would like to initiate a conversation. For example, the user can enter the first three letters of the name of the party with whom the user wishes to converse. The translator service 200 receives the user's selection, and queries the contacts directory for a match. If no match is found, the service notifies the user accordingly. If a match is found, however, the service invites the user to speak a message and then signify an end of the message. The user can then speak the message, and press pound, for example, to end the message.

The audio communication 206 is then passed to the VoiceXML gateway 230, which translates the audio message into a data message, as described in detail above. For example, the VoiceXML gateway may include recording means for recording the audio reply as a recorded audio data file, such as a .wav file, for example. The VoiceXML gateway 230 then sends a data communication 208 to the data device 202. The data communication 208 can include the origination address (the number of the audio device 204), destination address (of the data device 202), and the data message converted from the input audio. Preferably, the VoiceXML gateway 230 retains a data device id (address) associated with the data device 202 and an audio device id (calling line number) associated with the audio device 204 for the duration of the conversation.

Figure 9:
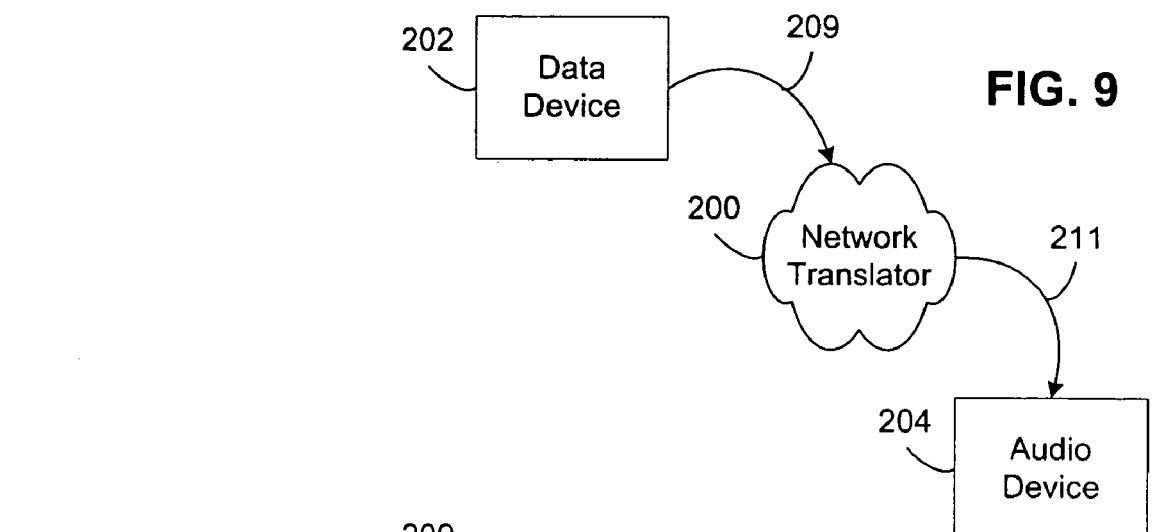
FIGS. 9 and 10 are functional block diagrams that depict a data-to-audio reply to a conversation between disparate communication devices initiated via an audio device.
Figure 10:
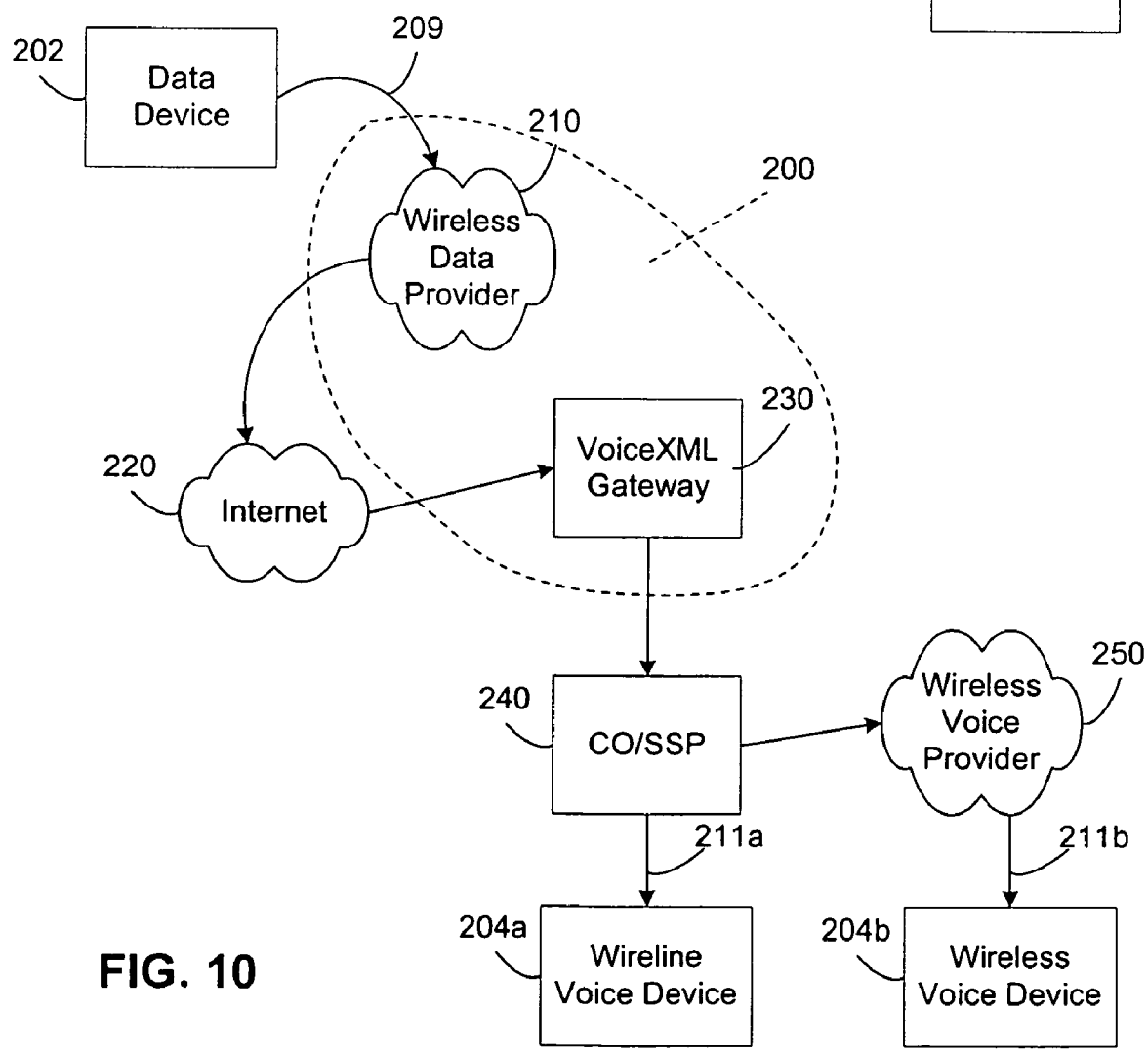

The data device 202 receives the data communication 208, and displays the data message. The user of the data device 202 can then reply by providing a data message via the data device 202. FIGS. 9 and 10 are functional block diagrams that depict a data-to-audio reply to a conversation between disparate communication devices initiated via an audio device. As described in detail above, the user of the data device 202 can provide a text message to be communicated back to the audio device 204. For example, Susan can type or otherwise provide a text message such as "Sorry, I can't. I'm stuck in a meeting. Can you pick up him up?" She then sends the data reply 209 by selecting a "send" option, for example, as is ordinarily provided by a data messaging client on such a data device.

The network translator 200 receives the data communication 209 from the data device 202. Where the data device is a wireless device, the wireless data provider 210 receives the data communication 209. Preferably, the data communication 209 includes an origination address that corresponds to the device that originated the message (e.g., an address that corresponds to Susan's PDA), a destination address that corresponds to the device to which the message is directed (e.g., Jim's home phone number), and the data message (e.g., the text message Susan provided) includes a destination number (e.g., Jim's home phone number), and the data (e.g., the text message Susan provided). The VoiceXML gateway 230 extracts the data message from the data communication 209, and translates the data message into an audio message as described above. The network translator 200 then provides the audio communication 211 to the audio device 204.

The user of the audio device 204 can end the conversation (by hanging up, for example), or continue the conversation by providing another audio message, which the network translator 200 will translate into a data communication (as described above) and provide to the data device 202. For example, Jim can say something like "OK, I'll pick him up. See you at home tonight." After completing his message, Jim presses the # key to initiate delivery of the reply communication to Susan's data device.

Figure 11:
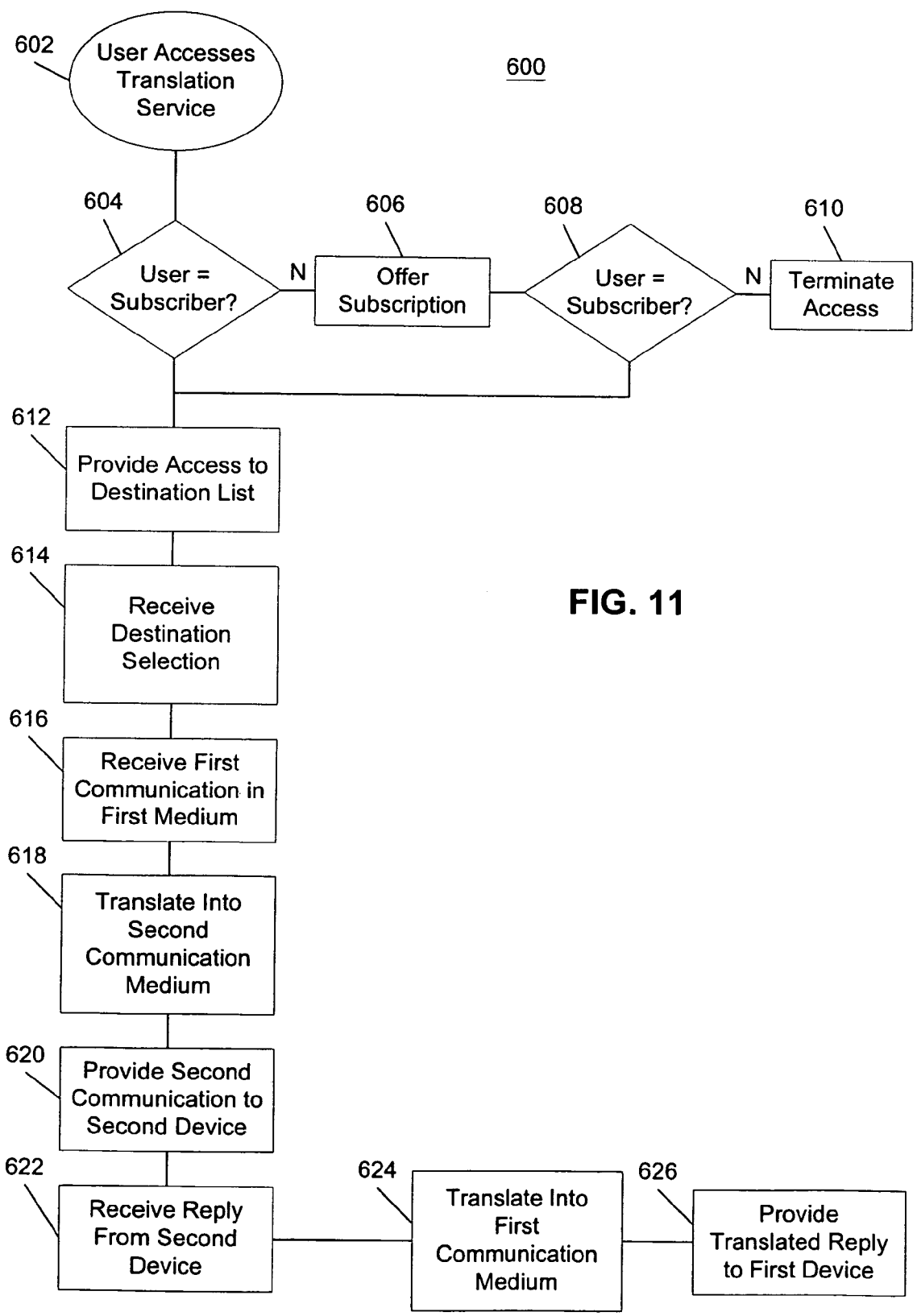
FIG. 11 provides a flowchart of an embodiment of a method according to the invention.

FIG. 11 provides a flowchart of a method 600 according to the invention for providing real-time conversation between disparate communications devices. At step 602, the user accesses the translation service to provide data necessary to set up the user's contacts list. The user can access the translation service via telephone (e.g., by dialing a telephone number associated with the service), or via the Internet (e.g., by using a browser on the user's computer to connect to a web site that the notification service provides). In any event, the translation service provides a user interface via which the user can set up a contacts profile that includes a destination list as described above.

Preferably, the translation service is implemented as a subscription service. That is, only paid subscribers can utilize the service. It should be understood, however, that the service could also be implemented such that a subscription is unnecessary. If the service is implemented as a subscription service, then, at step 604, the service determines whether the user is a subscriber to the service. Otherwise, the service skips to step 614.

Preferably, the translator includes a data store that contains a respective account ID and a user signature for each subscriber. A user signature can include, for example, a user ID/password combination associated with the respective subscriber. The account ID can be, for example, a unique alphanumeric identifier that the service assigns to the respective subscriber's account. At step 604, the service invites the user to input a user signature, and determines whether the user is a subscriber by determining whether the input signature is in the data store. Preferably, the service also provides a mechanism by which the user can change his/her signature (e.g., by changing his/her password), and by which the user can provide a friendly name associated with him/herself.

If, at step 604, the translator determines that the user is not a subscriber (e.g., if the input user signature is not in the data store), then, at step 606, the service provides a user interface via which the user can subscribe to the service. For example, if the service is implemented as a telephone based service, the service can invite the user to subscribe by providing an audio message such as "If you wish to subscribe to this service, please press or say '1.'" The service can then prompt the user to set up an account (e.g., input a signature, friendly name, and preferred payment information) using the telephone keypad or transceiver. Similarly, if the service is implemented as a web-based service, the service can invite the user to subscribe by providing a window (or a link to a subscription web page) that enables the user to set up an account.

At step 608, the service determines whether the user has elected to subscribe. If, at step 608, the service determines that the user has not elected to subscribe (e.g., the user cancels the transaction or does not input the requested data within a certain timeout period), then, at step 610, the service terminates access (by disconnecting the telephone call or providing an error message on the web page, for example).

If the service determines that the user is a subscriber, or if the service is not implemented as a subscription service, then the service, at step 612, provides the user with access to a destination list. The destination list can be associated with the user signature or with the communication device the user is using to communicate with the translation service. The user can then select a destination with which to establish a real-time conversation. At step 614, the service receives the selected destination, and attempts to establish a communication pathway to that destination. If such a communication pathway cannot be established, the service so notifies the user.

The user can then initiate the conversation by generating a first communication in a first medium. The first communication can include a first message, such as text or speech, depending on the communication medium (data or audio) used. The translation service receives the first communication at step 616 and translates the first communication into a second communication at step 618. The second communication is in a second medium, which is different from the first medium. That is, if the first communication medium is data, then the second communication medium is audio, and vice versa.

At step 620, the translation service provides the second communication to a second communication device, which operates in a second communication mode that is compatible with the second communications medium. The second communication device provides the second message to the user of the second device.

The user of the second (i.e., receiving device) can end the conversation or continue by replying. At step 622, the translation service receives a reply communication from the second device and, at step 624, translates the reply communication into the first communication medium. At step 626, the translation service provides the translated reply to the first communication device.

Thus, there have been described systems and methods for providing real-time conversation among a plurality of disparate communication devices. Those skilled in the art will appreciate that numerous changes can be made to the preferred embodiments of the invention, and that such changes can be made without departing from the spirit of the invention. It is intended, therefore, that the appended claims cover all such equivalent variations as fall within the true spirit and scope of the invention.

What is claimed is:

1. A method for providing real-time conversation between disparate communication devices, the method comprising:
providing a list of second communication devices associated with a second user to a first user of a first communication device, wherein at least one of the listed second communication devices operates in a second communication mode that is different from the other listed second communication devices;
receiving a selection by the first user of one of the listed second communication devices;
receiving a first communication from the first communication device operating in a first communication mode;
determining if a translation is necessary;
if a translation is necessary and prior to translating the first communication into a second communication that is suitable for processing by the selected second communication device operating in the second communication mode, attempting to establish a connection in the second communication mode;
if a connection is established then translating the first communication into a second communication that is suitable for processing by the selected second communication device operating in the second communication mode, wherein the second communication mode is different from the first communication mode,
extracting a message from the second communication, and
providing the second communication to the selected second communication device, wherein the second communication provides the second communication device with an opportunity to respond; and
if a connection is not established then notifying the first user with a return message in the first communication mode.

2. The method of claim 1, further comprising:
receiving a third communication from the selected second communication device as a result of the second communication device responding to the second communication;

translating the third communication into a fourth communication that is suitable for processing by the first communication device operating in the first communication mode; and providing the fourth communication to the first communication device.

3. The method of claim 1, wherein the fourth communication provides the first communication device with an opportunity to respond, the method further comprising:
receiving a fifth communication from the first communication device as a result of the first communication device responding to the fourth communication;
translating the fifth communication into a sixth communication that is suitable for processing by the selected second communication device operating in the second communication mode; and
providing the sixth communication to the selected second communication device.

4. The method of claim 1, wherein the first communication mode is data and the second communication mode is audio.

5. The method of claim 4, wherein translating the first communication comprises converting data in a VoiceXML format data to audio.

6. The method of claim 5, wherein translating the second communication comprises converting the audio to VoiceXML format data.

7. A computer readable medium containing instructions encoded thereon that perform acts to provide real-time conversation between disparate communication devices, the acts comprising:
providing a list of second communication devices associated with a second user to a first user of a first communication device, wherein at least one of the listed second communication devices operates in a second communication mode that is different from the other listed second communication devices;
receiving a selection by the first user of one of the plurality of second communication devices;
receiving a first communication from the first communication device operating in a first communication mode;
determining if a translation is necessary;
if a translation is necessary and prior to translating the first communication into a second communication that is suitable for processing by the selected second communication device operating in the second communication mode, attempting to establish a connection in the second communication mode;
if a connection is established then translating the first communication into a second communication that is suitable for processing by the selected second communication device operating in the second communication mode, wherein the second communication mode is different from the first communication mode,
extracting a message from the second communication, and
providing the second communication to the selected second communication device, wherein the second communication provides the selected second communication device with an opportunity to respond;
if a connection is not established then notifying the first user with a return message in the first communication mode.

8. The computer readable medium of claim 7, wherein the acts further comprises:
receiving a third communication from the second communication device as a result of the selected second communication device responding to the second communication;
translating the third communication into a fourth communication that is suitable for processing by the first communication device operating in the first communication mode; and
providing the fourth communication to the first communication device.

9. The computer readable medium of claim 7, wherein the fourth communication provides the first communication device with an opportunity to respond, the acts further comprising:
receiving a fifth communication from the first communication device as a result of the first communication device responding to the fourth communication;
translating the fifth communication into a sixth communication that is suitable for processing by the selected second communication device operating in the second communication mode; and
providing the sixth communication to the selected second communication device.

10. The computer readable medium of claim 7, wherein the first communication mode is data and the second communication mode is audio.

11. The computer readable medium of claim 10, wherein translating the first communication comprises converting data in a VoiceXML format data to audio.

12. The computer readable medium of claim 11, wherein translating the second communication comprises converting the audio to VoiceXML format data.

13. A system for providing real-time conversation between disparate communications devices, the system comprising:
providing means for providing a list of second communication devices associated with a second user to a first user of a first communication device, wherein at least one of the listed second communication devices operates in a second communication mode that is different from the other listed second communication devices;
receiving means for receiving a selection by the first user of one of the plurality of second communication devices;
receiving means for receiving a first communication from the first communication device operating in a first communication mode;
translation means for translating the first communication into a second communication that is suitable for processing by the selected second communication device operating in the second communication mode, wherein the second communication mode is different from the first communication mode;
determination means for determining if a translation is necessary,
if a translation is necessary and prior to translating the first communication into a second communication that is suitable for processing by the selected second communication device operating in the second communication mode, attempting to establish a connection in the second communication mode,
if a connection is established then extracting a message from the second communication,
if a connection is not established then notifying the first user with a return message in the first communication mode, and
transmission means for providing the second communication to the selected second communication device, wherein the second communication provides the selected second communication device with an opportunity to respond.

14. The system of claim 13,
wherein the receiving means is also for receiving a third communication from the selected second communication device operating in the second communication mode,
wherein the translation means is also for translating the third communication into a fourth communication that is suitable for processing by the first communication device operating in the first communication mode, and
wherein the transmission means is also for providing the fourth communication to the first communication device, wherein the fourth communication provides the first communication device with an opportunity to respond.

15. The system of claim 13, wherein the first communication mode is data and the second communication mode is audio.

16. The system of claim 15, wherein the means for translating the first communication is for converting data in a VoiceXML format data to audio.

17. The system of claim 16, wherein the means for translating the second communication is for converting the audio to VoiceXML format data.

* * * * *